Nov. 7, 1944.   C. W. SNYDER   2,362,033
AIRCRAFT CONSTRUCTION
Filed June 3, 1939
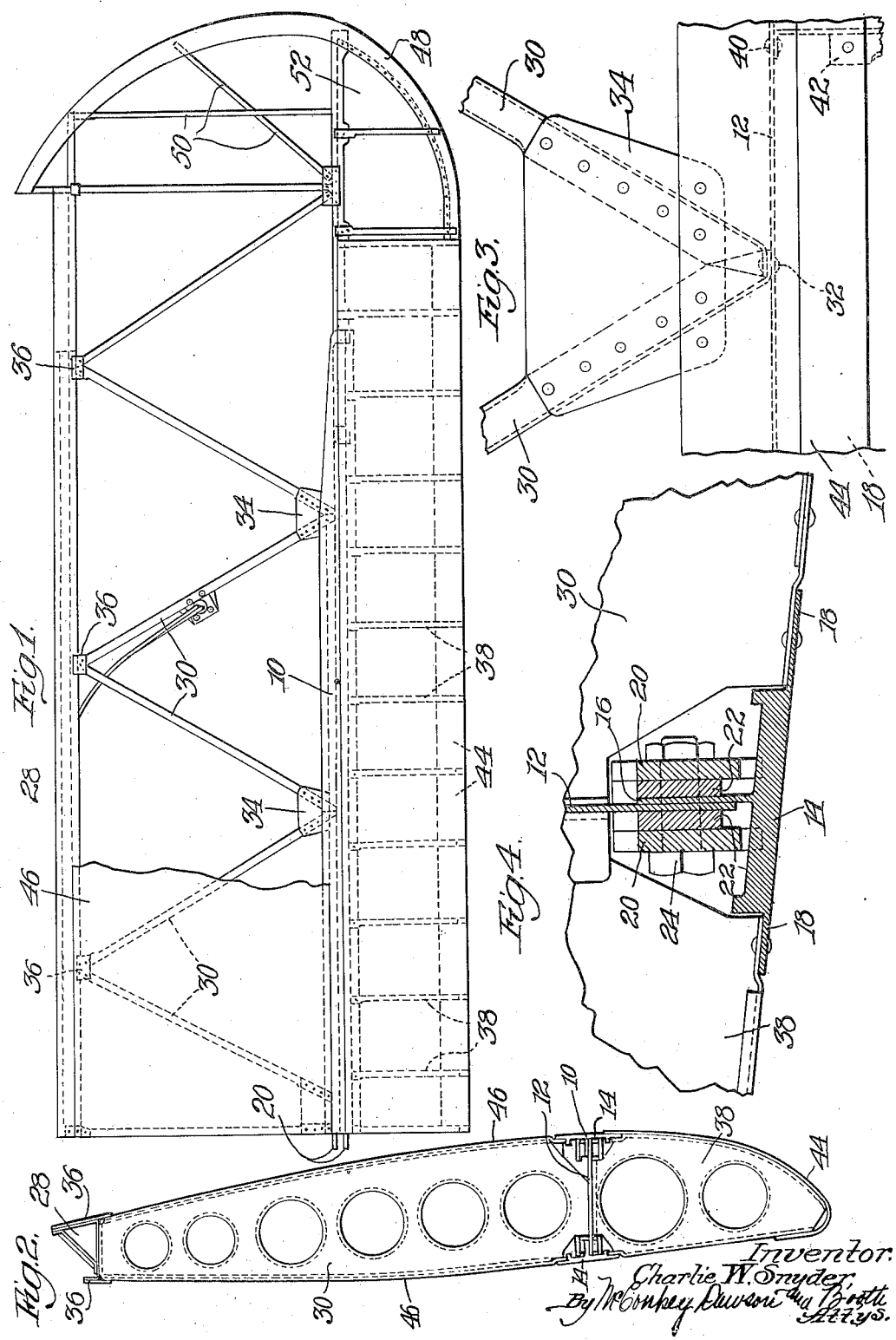

Patented Nov. 7, 1944

2,362,033

UNITED STATES PATENT OFFICE 2,362,033

AIRCRAFT CONSTRUCTION

Charlie W. Snyder, Washington, D. C., assignor to Engineering and Research Corporation, Riverdale, Md., a corporation of Maryland Application June 3, 1939, Serial No. 277,215

3 Claims. (Cl. 244—123)

This invention relates to aircraft construction and more particularly to airplane wings and like supporting elements.

One of the objects of the invention is to provide a wing which is light and strong and in which the load carrying elements of the wing provide the desired airfoil shape.

Another object of the invention is to provide an airplane wing in which the usual longitudinal shaping ribs are omitted. According to an important feature of the invention the shaping function of these ribs is performed by reinforcing members forming a part of the load carrying structure of the wing.

Other objects, advantages and novel features of the invention will be apparent from the following description when read in connection with the accompanying drawing, in which:

Figure 1 is a bottom plan view of an airplane wing embodying the invention with the skin covering partially broken away;

Figure 2 is an end view of the wing of Figure 1;

Figure 3 is an enlarged partial plan view; and

Figure 4 is an enlarged partial section.

The illustrated wing comprises a main beam 10 extending transversely to the line of flight and forming the principal transverse load carrying member. The beam 10 is formed by a web 12 and upper and lower edge members 14 formed with an inwardly extending flange 16 and edge flanges 18. The flange 16 is secured to the web 12 by rivets or the like along the length of the beam and at the inner end connector plates 20 spaced by washers 22 are secured to the web 12 and flange 16 by bolts 24. The connector plates project from the inner end of the wing and serve to secure the beam 10 to the airplane fuselage or to a center wing section.

A second beam 28 is arranged adjacent the trailing edge of the wing and as shown is formed as a triangular closed section beam.

The beams 10 and 28 are connected by a series of diagonal reinforcing members 30 arranged at acute angles to the beams with the ends of adjacent members in the series meeting alternately at the beam 10 and the beam 28. As best seen in Figure 3 the members 30 are overlapped at their meeting ends adjacent the beam 10 and are riveted to the web 12 as shown at 32. Preferably plates 34 are provided secured to the edges of the reinforcing members and to the flange 18 by riveting or the like to fasten the rinforcing members more securely. The reinforcing members may be fastened to the beam 28 in a similar manner by suitable riveting and by plates 36 secured to the beam and the reinforcing members.

According to one important feature of the invention, the upper and lower edges of the reinforcing members 30 are shaped to conform to an airfoil section. That is, the edge shape is such that a projection of the edge shape in a plane parallel to the line of flight follows an airfoil section so that a skin covering over the wing will be correspondingly shaped. Preferably the edges of the reinforcing members are bent over at substantially a right angle to provide a smooth surface and to form fastening flanges. Thus no parallel ribs are required to provide the wing shape.

The leading edge of the wing is formed by a series of short ribs 38 riveted to the web 12 as indicated at 40 and having flanged portions 42 riveted to the forward flange 18. The ribs 38 are covered by a skin 44, preferably of sheet metal, overlying and secured to the ribs and riveted to the forward flange 18. As best seen in Figure 2, the skin 44 extends over the top and forward portion of the leading edge structure and terminates short of the beam 10 on the lower surface.

The upper and lower wing surfaces are covered by a suitable skin 46 which may be of metal or fabric or other suitable material as desired. The skin 46 is secured to the upper edge of beam 10 and extends at the bottom to the edge of skin 44. The skin 46 is secured to the edges of the reinforcing members 30 by rivets, cement or other desired fastening means and is shaped by the members 30 to form, with the leading edge structure, an airfoil section. When a fabric covering is used it preferably extends from the upper edge of beam 28 over the main beam 10 and sheet 44 continuously to the lower edge of beam 28.

As shown in Figure 1, the end or tip of the wing is formed by a channel member 48 secured to the beams 10 and 28 and to reinforcing members 50. The leading edge portion of the tip may be covered by a continuation of the skin 46 or by separate skin members 52. The rearward portion of the tip may similarly be covered by a continuation of the skin 46 or by separate skin members, not shown.

The beam 28 is adapted to support an aileron, a flap, a right trailing edge structure, or the like to complete the trailing edge shape.

In use the beams 10 and 28 form the principal transverse load-carrying members and with the reinforcing members 30 form, in effect, a horizontal truss resisting drag load and torsion. At the same time the members 30 act as shaping members for the wing surface so that the usual longitudinal shaping ribs may be omitted in the body of the wing. Preferably the longitudinal brace 50 and a similar member at the opposite end of the wing are shaped to maintain the desired section at the wing ends. Thus a very light, strong wing having a minimum of dead weight is provided.

While the invention has been particularly described in connection with an airplane wing, it will be understood that it is equally applicable to other parts of an aircraft and that various changes might be made therein without departing from the invention. It is therefore not intended to limit the scope of the invention to the exact construction shown nor otherwise than by the terms of the appended claims.

What is claimed is:

1. An airplane wing construction, comprising a spar extending longitudinally of the wing adjacent its leading edge, a second spar extending longitudinally of the wing adjacent its trailing edge, the upper and lower edges of the spars being formed with flanges lying substantially in the upper and lower wing surfaces respectively, a plurality of reinforcing members extending alternately in opposite acute angular directions between said spars to provide a triangulated truss structure, the ends of the reinforcing members being overlapped and secured to the webs of the spars and the upper and lower portions of the members extending between and being secured to the flanges and the edges of the reinforcing members being shaped to provide an airfoil wing section, and continuous flexible skins secured at their opposite edges to the flanges on the spars respectively and overlying and secured to the edges of the reinforcing members between the spars.

2. An airplane wing construction, comprising a spar extending longitudinally of the wing adjacent its leading edge, a second spar extending longitudinally of the wing adjacent its trailing edge, the upper and lower edges of the spars being formed with flanges lying substantially in the upper and lower wing surfaces respectively, a plurality of reinforcing members extending alternately in opposite acute angular directions between said spars to provide a triangulated truss structure, the ends of the reinforcing members being overlapped and secured to the webs of the spars and the upper and lower portions of the members extending between and being secured to the flanges and the edges of the reinforcing members being shaped to provide an airfoil wing section, continuous flexible skins secured at their opposite edges to the flanges on the spars respectively and overlying and secured to the edges of the reinforcing members between the spars, a leading edge structure secured to the forward side of the first named spar, and a trailing edge structure secured to the rear side of the second spar.

3. An airplane wing construction, comprising a spar extending longitudinally of the wing adjacent its leading edge, a second spar extending longitudinally of the wing adjacent its trailing edge, the upper and lower edges of the spars being formed with flanges lying substantially in the upper and lower wing surfaces respectively, a plurality of reinforcing members extending alternately in opposite acute angular directions between said spars to provide a triangulated truss structure, the ends of the reinforcing members being overlapped and secured to the webs of the spars, plates overlying and secured to the edges of the reinforcing members adjacent their ends and fitting under and secured to the flanges on the spars, the edges of the reinforcing members between the spars being shaped to provide an airfoil section, and continuous flexible skins secured at their opposite edges to the flanges on the spars respectively and overlying and secured to the edges of the reinforcing members between the spars.

CHARLIE W. SNYDER.